(12) United States Patent
Yoshino et al.

(10) Patent No.: US 6,401,016 B1
(45) Date of Patent: Jun. 4, 2002

(54) VEHICLE CONTROL DEVICE

(75) Inventors: Takahiro Yoshino, Yokosuka; Yuki Nakajima, Yokohama, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/709,573

(22) Filed: Nov. 13, 2000

(30) Foreign Application Priority Data

Nov. 12, 1999 (JP) ............................................. 11-322281
Apr. 7, 2000 (JP) ........................................ 2000-106386

(51) Int. Cl.[7] ................................................. B60K 6/04
(52) U.S. Cl. ........................... 701/22; 701/51; 318/139; 318/448; 318/618; 477/3; 477/5; 180/65.4
(58) Field of Search ...................... 701/22, 51; 318/139, 318/432, 448, 615, 618, 376, 8, 460; 180/65.8, 65.4, 65.2; 477/5, 3

(56) References Cited

U.S. PATENT DOCUMENTS 6,123,163 A * 9/2000 Otsu et al. .................. 180/65.8
6,155,954 A * 12/2000 Itoyama et al. ................. 477/5
6,175,785 B1 * 1/2001 Fujisawa et al. ............... 701/22
6,223,106 B1 * 4/2001 Yano et al. .................... 701/22
6,223,842 B1 * 5/2001 Masaki ....................... 180/65.2

FOREIGN PATENT DOCUMENTS

JP              11122710 A   *   4/1999

* cited by examiner

Primary Examiner—William A. Cuchlinski, Jr.
Assistant Examiner—Tuan C To
(74) Attorney, Agent, or Firm—Foley & Lardner

(57) ABSTRACT

A target output torque and target power generation output of a motor are computed based on a vehicle running state, and a target input rotation speed of a generator is computed based on the target power generation output. The final target output torque of the motor is computed by performing delay processing on the target output torque using a filter of second or higher order. The same delay processing by an identical filter is performed on the target input rotation speed, and the final target input rotation speed supplied to the generator is computed. In this way, the response of the driving power output (=power consumption of the motor) and the generated power of the generator are made to coincide even if the vehicle running state changes sharply, and the battery capacity can be minimized.

11 Claims, 11 Drawing Sheets

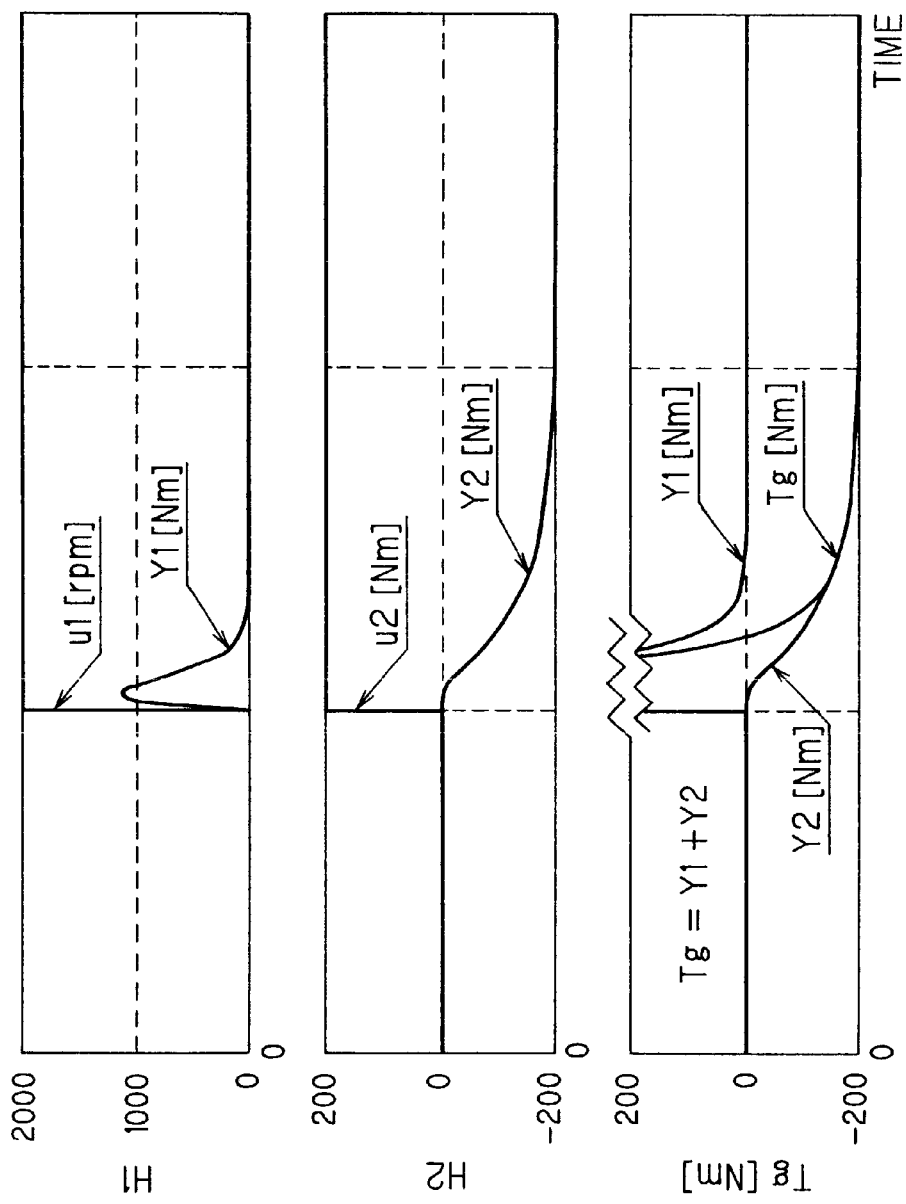

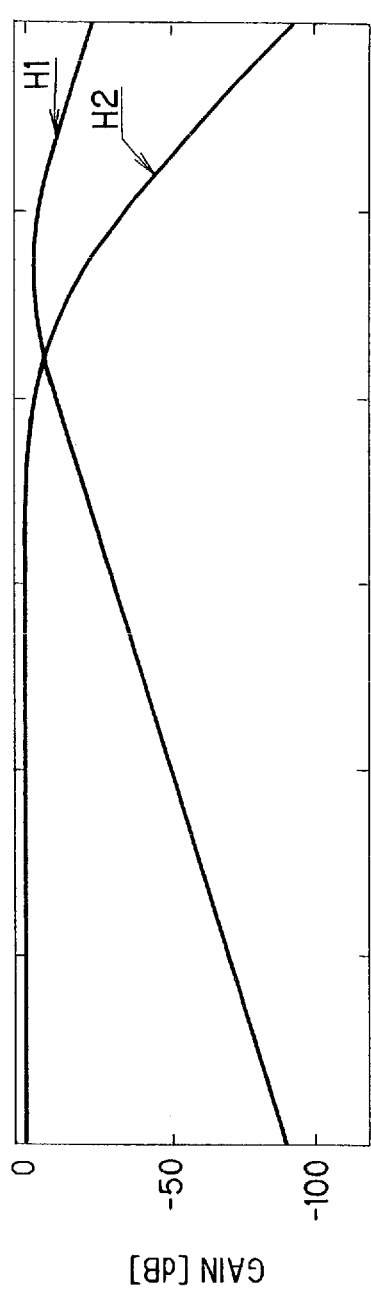
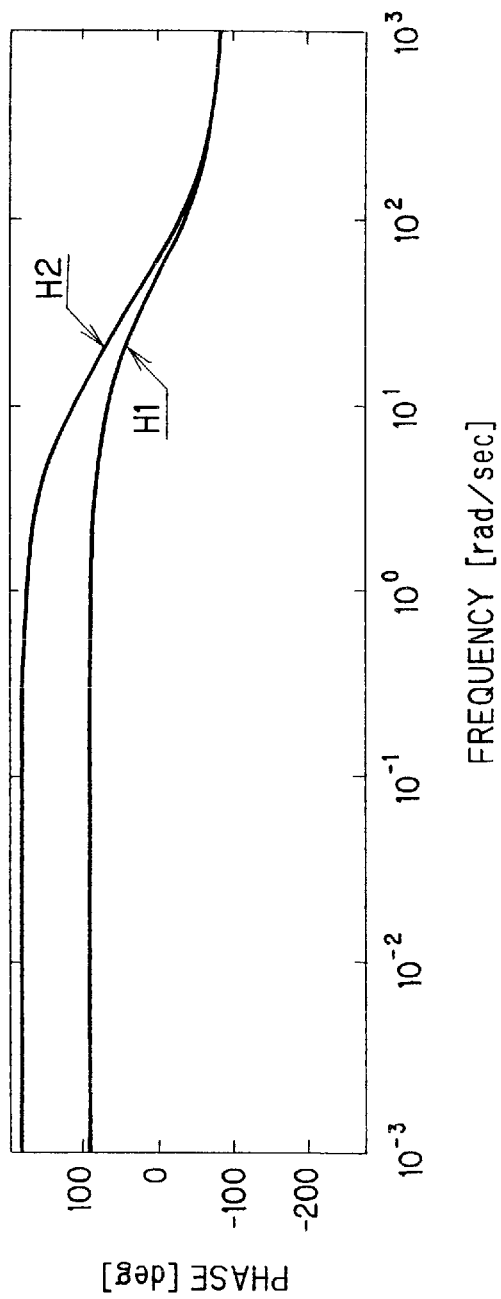
FIG. 4(a)
FIG. 4(b)

VEHICLE CONTROL DEVICE

FIELD OF THE INVENTION

The present invention relates to a control device for a vehicle equipped with an engine, a motor and a generator.

BACKGROUND OF THE INVENTION

In recent years, the use of hybrid vehicles equipped with an engine a motor and a generator is becoming more common due to demand for low pollution, longer travel range and an infrastructure for energy supply. The parallel hybrid vehicle (referred to hereafter as PHEV) which is already in practical use mainly runs on the engine, and increases fuel cost-performance by assisting the driving force by the motor using the power recovered during deceleration, etc.

On the other hand, there is also a series hybrid vehicle (referred to hereafter as SHEV) which aims at much higher efficiency. In an SHEV, the vehicle is driven only by the motor and the engine is used only for driving a generator. The SHEV as conventionally proposed makes the enhancement of efficiency its primary goal, so the engine is operated under certain fixed conditions for which fuel-cost performance is optimized.

However, in such a SHEV, as it is necessary to vary the running state of a vehicle without changing the driving state of the engine, a battery of sufficient capacity is needed, and an increase of weight and cost cannot be avoided.

SUMMARY OF THE INVENTION

The Inventors therefore proposed a hybrid vehicle having the same mechanical structure as a SHEV, i.e., an engine, a motor and a generator, wherein the power consumed by the motor for vehicle running is computed at every instant, and the engine and generator are controlled to generate sufficient power for this. If the power consumed by the motor and the power generated by the generator are in agreement, only a minimum capacity is required, the battery which is a factor leading to increased weight and cost can be made compact, and costs can be suppressed.

However, as the power consumed by the motor and the power generated by the generator are no longer in agreement when the running state of the vehicle changes suddenly, such as when the driver depresses the accelerator pedal abruptly, for example, a battery which has a capacity which can compensate for the excess or deficiency must be provided.

Such an excess or deficiency arises when the running state changes suddenly, because, even if a command is given simultaneously to the generator and engine that the power generation amount should be adjusted, the response of the engine is very slow compared with the response of the generator. For example, even if a command is given to increase the rotation speed of the engine and generator to increase the power generation amount corresponding to the increase of drive torque, as the engine response is slow, the generator whose rotation speed is controlled generates a drive torque using the battery power and the rotation speed increases before the rotation speed increases due to increase of engine torque. As a result, the power generation amount of the generator temporarily decreases although it is necessary to increase the power generation amount, and the generator also consumes an excessive amount of power, so the difference between the power generation amount and the power consumption increases.

If filtering is performed on the command value to the generator to delay the apparent response of the generator, as disclosed in JP-A-H11-122710 published in 1999 by the Japanese Patent Office, power consumption by the generator can be suppressed. However, although the response of the generator is delayed by the filter, the driving power output of the motor increases immediately, so the discrepancy between the generated power and the power consumption is not eliminated.

Is therefore an object of this invention to make the power consumed by the motor coincide with the power generated by the generator even if the running state of the vehicle changes suddenly, and to further reduce the required battery capacity.

In order to achieve above object, this invention provides a control device for a vehicle, the vehicle comprising an engine, a generator connected to the engine, and a motor driven by the power generated by the generator, connected to a drive shaft of the vehicle, and the control device comprising a sensor which detects a vehicle speed, a sensor which detects an accelerator depression amount, and a microprocessor. The microprocessor is programmed to compute either of a target driving force and target output torque of the motor based on the vehicle speed and accelerator depression amount, compute a delayed target output torque of the motor by performing a delay processing on either of the target driving force and target output torque, and control the torque of the motor based on the delayed target output torque.

The details as well as other features and advantages of this invention are set forth in the remainder of the specification and are shown in the accompanying drawings.

BRIEF DESCRIPTION OF THE DRAWINGS

FIGS. 3(a)–3(c) show a step response of H1, H2.

FIGS. 4(a)–4(b) show a frequency response of H1, H2.

DESCRIPTION OF THE PREFERRED EMBODIMENTS

Figure 1:
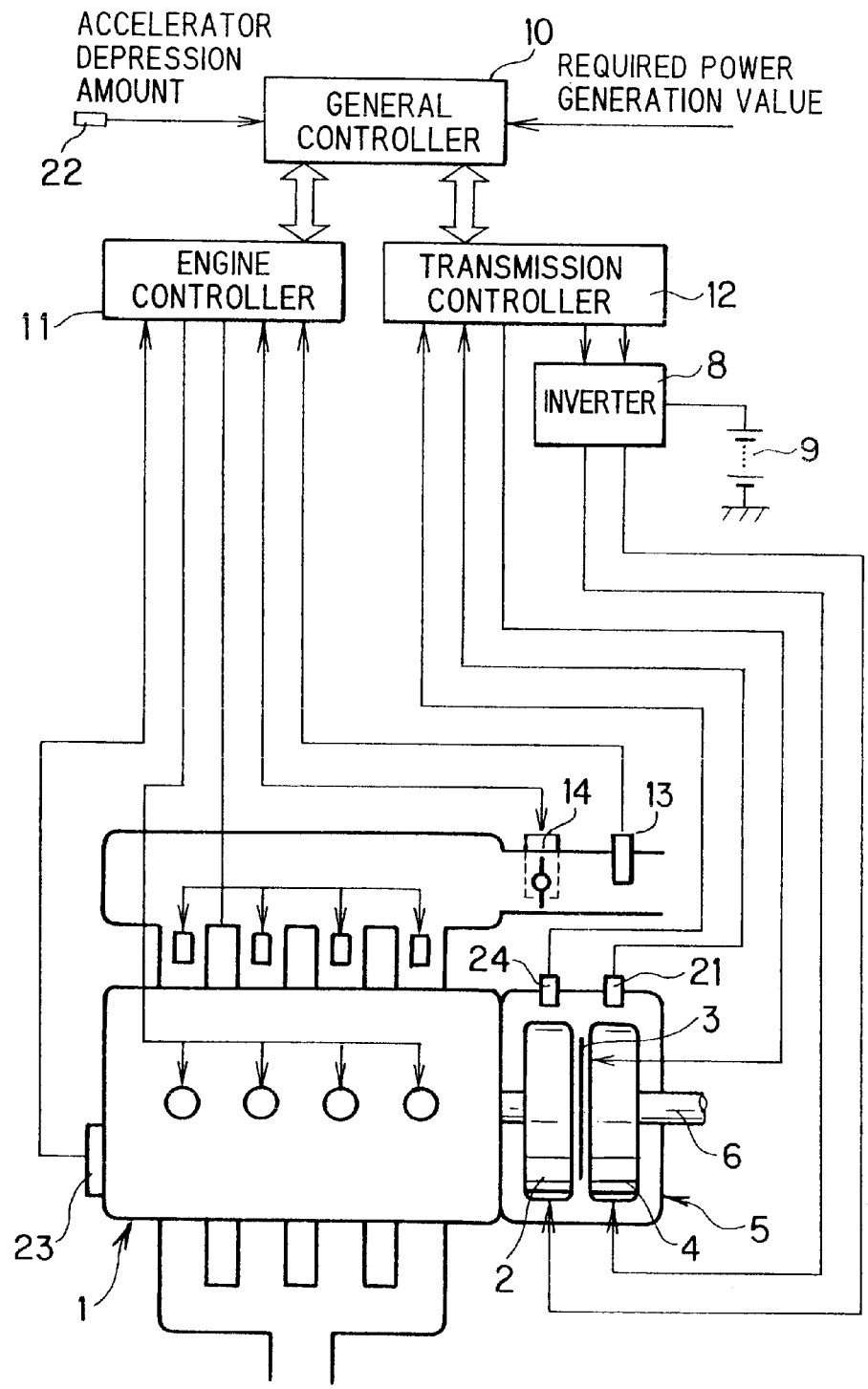
FIG. 1 is a schematic view of a hybrid vehicle according to this invention.

Referring to FIG. 1 of the drawings, a vehicle is provided with an engine 1 and an electrical transmission 5 which functions as a continuously variable transmission.

The electrical transmission 5 comprises a generator 2 and a motor 4. The generator 2 disposed on the input side is connected to a crank shaft of the engine 1, and the motor 4 disposed on the output side 1 is connected to a drive shaft 6 of the vehicle. The generator 2 and motor 4 are AC machines such as a permanent magnet type AC synchronous motor, and are respectively connected to an inverter 8. A battery 9 (lithium battery or nickel hydrogen battery) is connected to the inverter 8.

A clutch 3 is interposed between the generator 2 and motor 4. When the clutch 3 is engaged, the engine 1 and drive shaft 6 are joined, and the drive shaft 6 can then be directly driven by the engine 1. The clutch 3 is engaged when, for example, the input rotation speed and output rotation speed of the electrical transmission 5 coincide. When the clutch 3 is engaged, losses in the generator 2 and motor 4 are suppressed, and fuel-cost performance of the vehicle improves.

An input rotation speed sensor 24 which detects a rotor rotation speed of the generator 2 (input rotation speed of the transmission 5), and an output rotation speed sensor 21 which detects a rotor rotation speed of the motor 4 (output rotation speed of the transmission 5), are attached to the electrical transmission 5. The ratio of the detected input rotation speed and output rotation speed is the speed ratio of the electrical transmission 5.

An intake passage of the engine 1 is provided with an electronically controlled throttle 14. The opening of the throttle 14 is controlled independently of the accelerator pedal operation of the driver to achieve a target engine torque set according to the required power generation amount. In addition, the engine 1 is provided with an air flow meter 13 which detects an intake air amount, and a crank angle sensor 23 which detects a crank angle of the engine 1.

A general controller 10 basically calculates the driving force required by the driver based on the detected accelerator pedal depression amount, etc., and controls the torque of the motor 4 via a transmission controller 12 so as to achieve the required driving force. Further, the rotation speed of the generator 2 is controlled via the transmission controller 12 and the torque of the engine 1 is controlled via an engine controller 11 to obtain a generated power suitable for the driving power output (power consumption) of the motor 4.

To suppress the capacity required for the battery 9, the general controller 10 computes a command value issued to the motor 4 (final target output torque) and a command value issued to the generator 2 (final target input rotation speed) so that the driving power output response and power generation response coincide.

Figure 2:
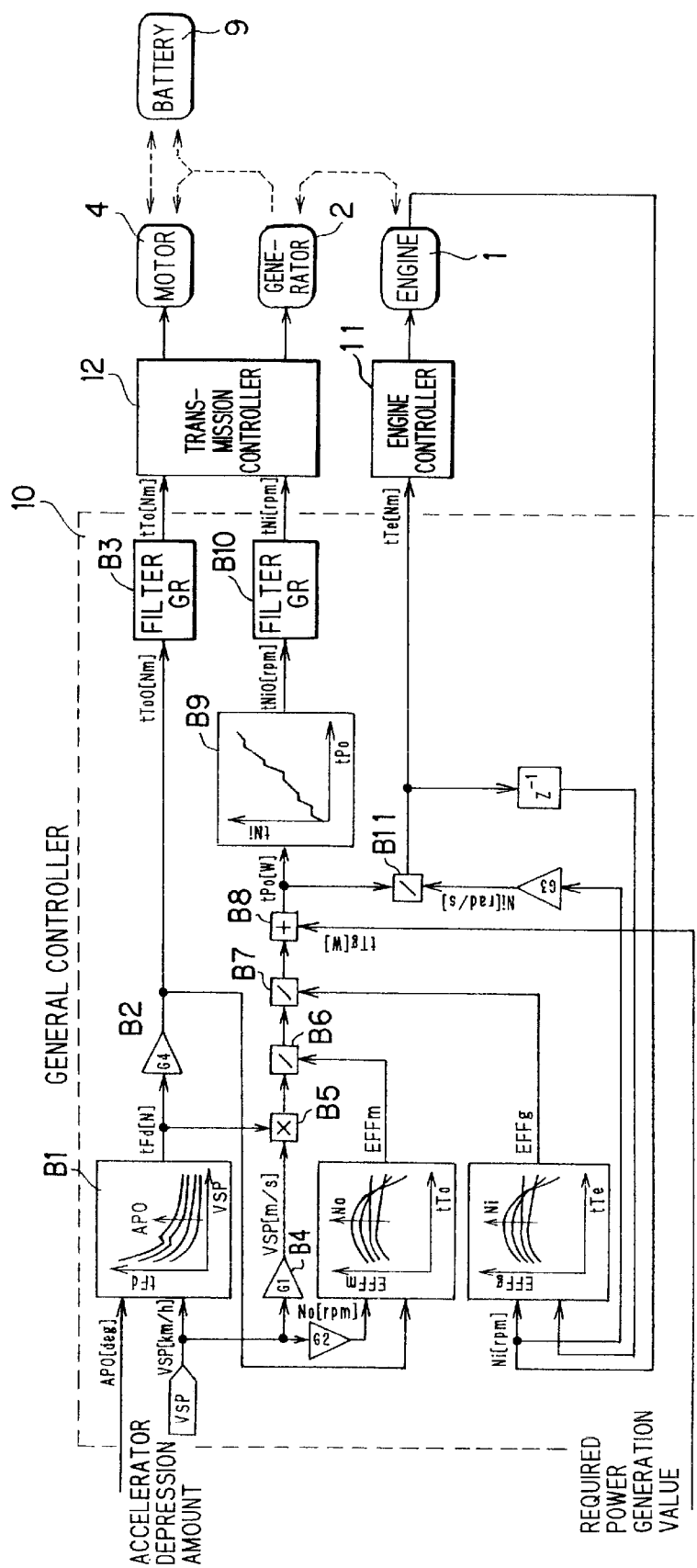
FIG. 2 is a control block diagram of a general controller.

FIG. 2 is a block diagram showing the control of the general controller 10. The part enclosed by the dotted line in the diagram corresponds to the general controller 10.

First, the general controller 10 computes a target driving force tFd by looking up a predetermined target driving force setting map, based on an accelerator pedal depression amount APO input from the accelerator depression amount sensor 22, and a vehicle speed VSP based on the output rotation speed of the electrical transmission 5 (B1). The general controller 10 then computes a target output torque tTo0 by multiplying this target driving force tFd by a constant G4=(tire effective radius)/(final gear ratio) (B2).

The general controller 10 computes a final target output torque tTo having a delay relative to the target output torque tTo0 by performing filtering by a second order filter GR, described later, on this target output torque tTo0 (B3), and outputs this to the transmission controller 12.

Herein, the target output torque tTo is calculated by performing filtering after converting the target driving force tFd to the target output torque tTo0, but instead, filtering may be performed directly on the target driving force tFd, and the target output torque tTo computed by multiplying by the constant G4 after filtering. Alternatively, a target output torque tTo0 can be computed directly by looking up the predetermined target output torque setting map based on the accelerator depression amount APO and vehicle speed VSP, and the target output torque tTo computed by performing filtering on this.

The general controller 10 converts the vehicle speed VSP [km/hour] to VSP [m/second] by multiplying by the constant G1=1000/3600 (B4). The general controller 10 computes a basic value of the target power generation output by multiplying VSP [m/second] by the target driving force tFd (B5). The general controller 10 also computes a target power generation output tPo by dividing this basic value by a motor efficiency EFFm found by looking up a predetermined map based on the running state of the motor 4 and a generator efficiency EFFg found by looking up a predetermined map based on the running state of the generator 2 (B6, B7), and adding a required power generation value Tg from outside (power generation amount required by electrical equipment such as the ignition system and lighting system) (B8).

A target input rotation speed tNi0 is then computed from this target power generation output tPo by looking up a predetermined table (B9). This table referred to here is set, for example, so as to select the rotation speed at which the engine 1 and generator 2 have the highest efficiency relative to the target power generation output tPo.

Filtering is also performed by the filter GR on the target input rotation speed tNi0 in the same way as the target output torque tTo0 (B10), and a final target input rotation speed tNi having a delay relative to the target input rotation speed tNi0 is computed. This final target input rotation speed tNi is output to the transmission controller 12, and the transmission controller 12 performs rotation speed feedback control of the generator 2 by PI control (proportional integral control).

The general controller 10 also divides the target power generation output tPo by the engine rotation speed Ni to compute a target engine torque tTe (B11), and outputs it to the engine controller 11.

The generator 2 is driven by the torque generated by the engine 1, and the motor 4 generates a torque by the power generated by the generator 2. When the generated power is insufficient, the power is compensated by the battery 9.

Next, the method of designing the filter GR will be described.

The filter GR is designed so that the generator 2 does not generate an excessive positive torque even if the running state of the vehicle changes suddenly. Performing a Laplace transformation on the differential equation of the physical model comprising the engine 1 and generator 2, the following equations (1), (2) are obtained.

$$Tg = (tNi - Ni) \times KP \cdot \left(1 + \frac{1}{TI \cdot s}\right) \times \frac{KG}{TG \cdot s + 1} \tag{1}$$

$$Ni = \left(\frac{KE}{TE \cdot s + 1} \times tTe + Tg\right) \times \frac{KI}{s} \tag{2}$$

where:
   TE=response time constant of engine 1,
   KE=response gain of engine 1 (=1),
   TG=response time constant of generator 2,
   KG=response gain of generator 2 (=1),
   KI=inverse of sum of rotation moments of engine 1 and generator 2,
   KP=proportional gain of rotation speed feedback control of generator 2, and
   TI=integral gain of rotation speed feedback control of generator 2.

Solving these equations for the torque Tg of the generator 2, the following equation:

$$Tg = \frac{KG \cdot KP \cdot TI \cdot s^2 + KG \cdot KP \cdot s}{TI \cdot TG \cdot s^3 + TI \cdot s^2 + KI \cdot KG \cdot KP \cdot TI \cdot s + KI \cdot KG \cdot KP} \cdot tNi + \quad (3)$$

$$\frac{-KE \cdot KI \cdot KG \cdot KP \cdot TI \cdot s - KE \cdot KI \cdot KG \cdot KP}{TE \cdot TI \cdot TG \cdot s^4 + (TE \cdot TI + TI \cdot TG) \cdot s^3 +} \cdot tTe$$
$$(KI \cdot KG \cdot KP \cdot TE + 1) \cdot TI \cdot s^2 +$$
$$KI \cdot KG \cdot KP \cdot (TE + TI) \cdot s + KI \cdot KG \cdot KP$$

is obtained, and the generator torque Tg can be written as the sum of responses relative to the target input rotation speed tNi and target engine torque tTe. Here, if a transfer function relative to the target input rotation speed tNi is written as:

$$H1 = \frac{KG \cdot KP \cdot TI \cdot s^2 + KG \cdot KP \cdot s}{TI \cdot TG \cdot s^3 + TI \cdot s^2 + KI \cdot KG \cdot KP \cdot TI \cdot s + KI \cdot KG \cdot KP} \quad (4)$$

and a transfer function relative to the target engine torque tTe is written as:

$$H2 = \frac{-KE \cdot KI \cdot KG \cdot KP \cdot TI \cdot s - KE \cdot KI \cdot KG \cdot KP}{TE \cdot TI \cdot TG \cdot s^4 + (TE \cdot TI + TI \cdot TG) \cdot s^3 +}, \quad (5)$$
$$(KI \cdot KG \cdot KP \cdot TE + 1) \cdot TI \cdot s^2 +$$
$$KI \cdot KG \cdot KP \cdot (TE + TI) \cdot s + KI \cdot KG \cdot KP$$

the step response of H1, H2 is as shown in FIGS. 3(a)–(c).

If the inputs are respectively u1 (0→2000 rpm), u2 (0→200 Nm), the responses are respectively Y1, Y2, but Y1 immediately varies largely towards the positive side, so the generator torque Tg follows and varies towards the positive side. In other words, as the gain of Y1 relative to u1 is larger than the gain of Y2 relative to u2, the generator torque Tg varies towards the positive side.

The respective frequency responses of H1, H2 are shown in FIGS. 4(a)–(b). The reason why the step response is as shown in FIGS. 3(a)–(c) is because the phases of the two are superimposed in the high frequency region and the gain of H1 is much larger than the gain of H2, as shown in FIG. 4(a)–(b).

According to this embodiment, this is improved by adding filtering by the filter GR, but provided that GR H1 does not have gain characteristics such that the gain decreases with the same Δ(gain)/Δ(frequency) or more sharply as H2 in the high frequency region, the gain of H2 will always be lower if the frequency is increased, and the generator torque Tg varies toward the positive side following the response of Y1.

Here, the filter GR is designed so that the characteristics in the high frequency region of GR HI coincide with H2. Calculating (−H2/H1) when s is allowed to vary to infinity, $$\left(-\frac{H2}{H1}\right)_{s\to\infty} = \quad (6)$$

$$\frac{KE \cdot KI \cdot TG}{KI \cdot KG \cdot KP \cdot TE + 1} \cdot \frac{1}{\left(\sqrt{\frac{TE \cdot TG}{KI \cdot KG \cdot KP \cdot TE + 1}}\right)^2 \cdot s^2 +}$$
$$2 \cdot \frac{TE + TG}{2\sqrt{TE \cdot TG \cdot (KI \cdot KG \cdot KP \cdot TE + 1)}} \cdot$$
$$\sqrt{\frac{TE \cdot TG}{KI \cdot KG \cdot KP \cdot TE + 1}} \cdot s + 1$$

which is a second order transfer function. Therefore, it is seen that to make GR H1 coincide with the characteristics of H2 in the high frequency region, the order of the filter must be two or more. Further, for the steady state deviation of GR He relative to the target input rotation speed to be zero or greater, the filter GR must have a gain of 1 in the low-frequency region.

From the above, the filter GR is given by the following equation.

$$GR = \frac{1}{\left(\frac{1}{CR}\sqrt{\frac{TE \cdot TG}{KI \cdot KG \cdot KP \cdot TE + 1}}\right)^2 \cdot s^2 +} \quad (7)$$
$$2 \cdot \frac{TE + TG}{2\sqrt{TE \cdot TG \cdot (KI \cdot KG \cdot KP \cdot TE + 1)}} \cdot \frac{1}{CR}$$
$$\sqrt{\frac{TE \cdot TG}{KI \cdot KG \cdot KP \cdot TE + 1}} \cdot s + 1$$

CR is a constant for adjusting the time constant of the filter GR. The time constant of the filter GR is:

$$T_{GR} = \frac{1}{CR}\sqrt{\frac{TE \cdot TG}{KI \cdot KG \cdot KP \cdot TE + 1}} \quad (8)$$

Considering the gain once again, the variation amount of the target input circuit speed tNi0 (e.g., 0→2000 rpm) is larger than the variation amount of the target engine torque tTe (e.g., 0→200 Nm). As a result, when for example the ratio of the two is 1/10 as in the above case, if the gain of GR H1 does not exceed 1/10 of the gain of H2, the generator torque Tg varies towards the positive side.

In other words, to suppress the variation of the generator torque Tg towards the positive side, the gain of GR H1 must be at least 20 dB lower than the gain of H2 in terms of frequency response.

In general, the gain of the second order response in the high frequency region is:

$$|G| = 1/(T \cdot \omega)^2 \quad (9)$$

where:
 ω=frequency [rad/sec].

Therefore, if the time constant of the filter GR is $T_0$ when the gain of GR H1 and the gain of H2 are equal, and the minimum value of the ratio of the "variation amount of the target engine torque tTe" to the "variation amount of the target input rotation speed tNi0" is G1 in the normal running state, $$T_{GR} = \frac{T_0}{\sqrt{G1}} \quad (10)$$

and the time constant adjustment coefficient CR may be determined to satisfy equation (10).

Here, if the ratio of the "variation amount of the target engine torque tTe" to the "variation amount of the target input rotation speed tNi0" is calculated at each instant, the time constant $T_{GR}$ of the filter GR can always be controlled to the optimum value.

Figures 5A, 5B:
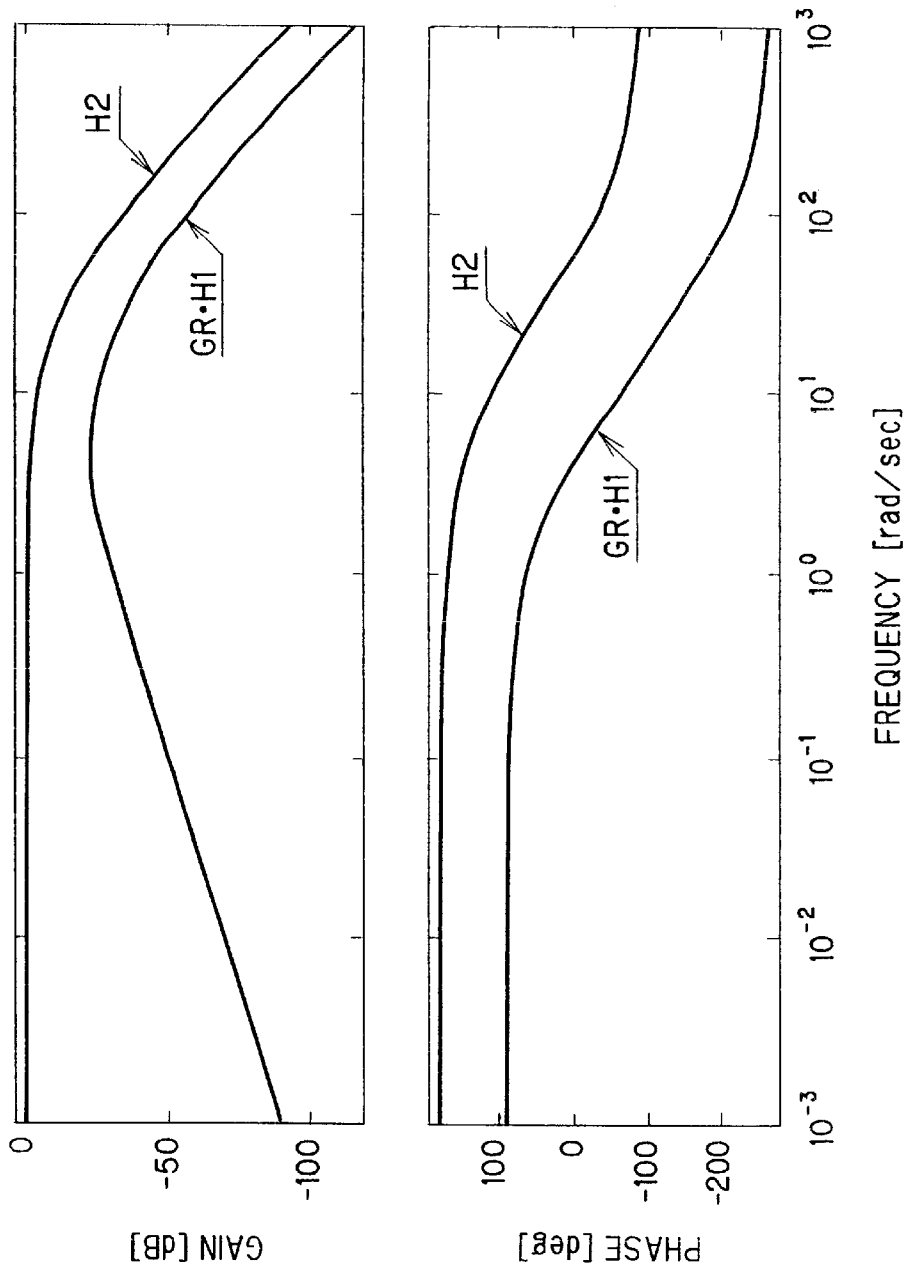
FIGS. 5(a)–5(b) show a frequency response of GR H1, H2.

FIGS. 5(a) and 5(b) show the frequency response of GR H1 and H2.

By performing filtering in this way, it is seen that GR H1 has gain characteristics such that the gain decreases with substantially the same Δ(gain)/Δ(frequency) as H2 in the high frequency region.

Figures 6A, 6B, 6C:
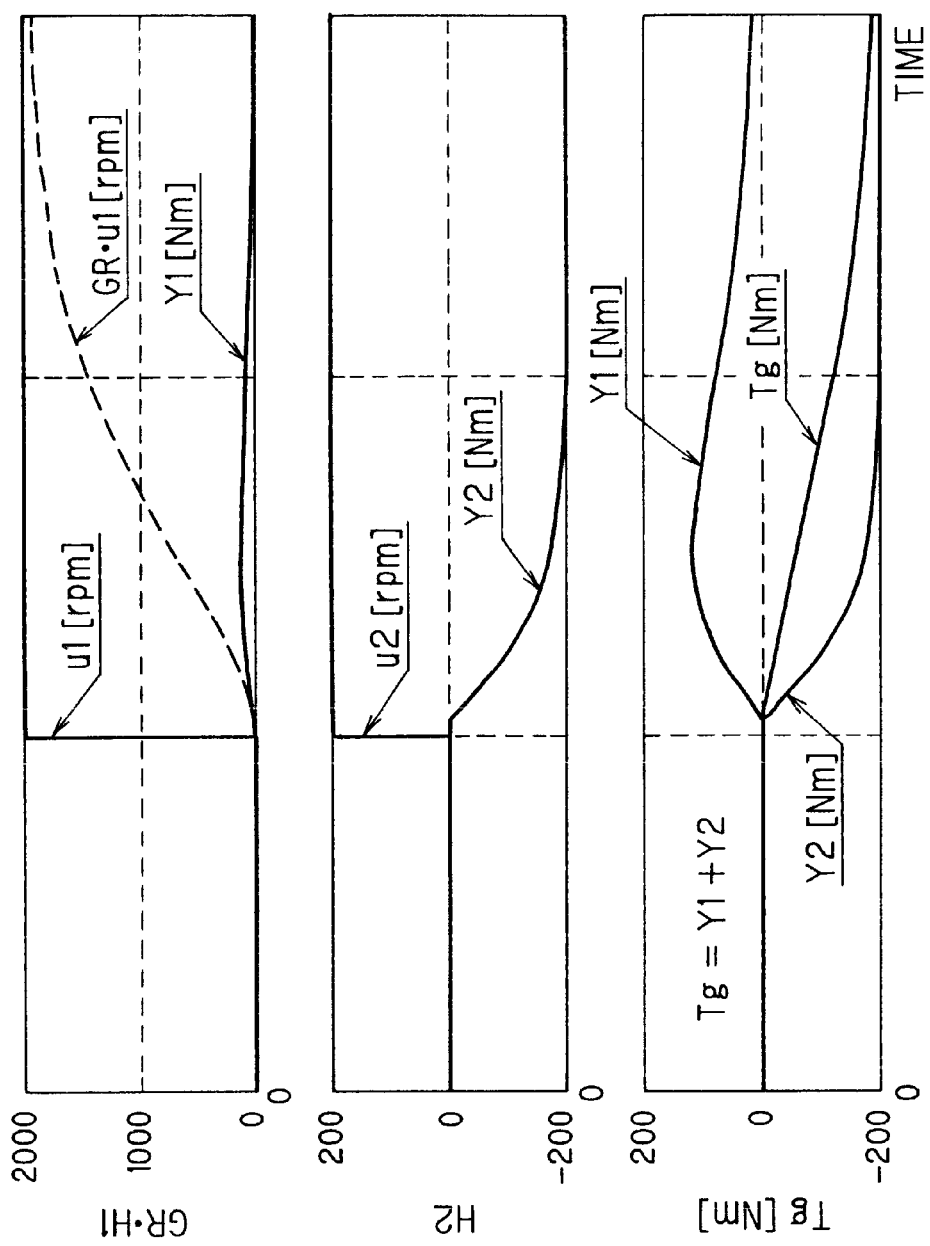
FIGS. 6(a)–6(b) show a step response of GR H1, H2.
Figure 7A:
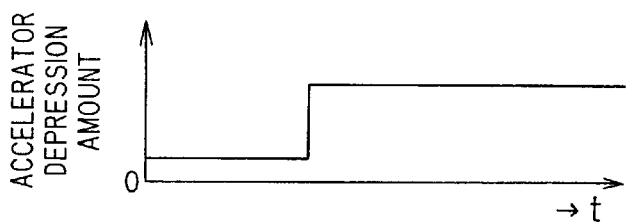
FIGS. 7(a)–7(h) show the response when an accelerator pedal is depressed in stepwise fashion when the vehicle is running (when this invention is not applied).
Figure 7B:
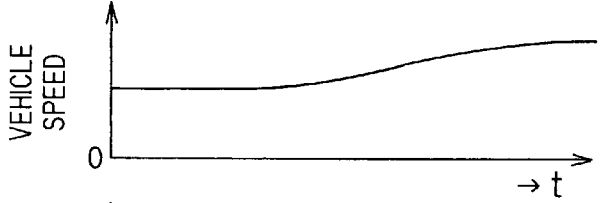
Figure 7C:
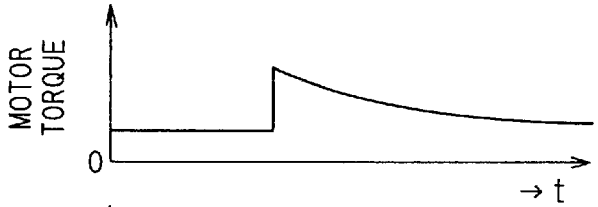
Figure 7D:
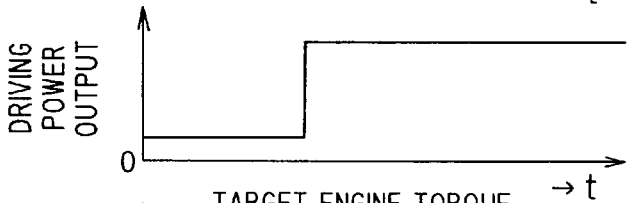
Figure 7E:
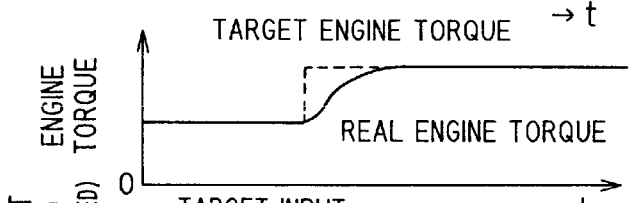
Figure 7F:
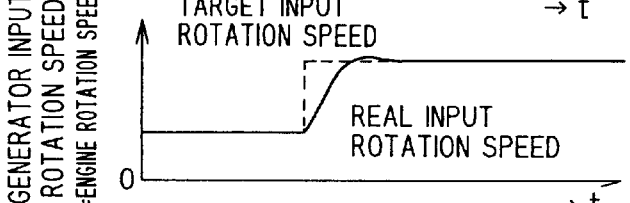
Figure 7G:
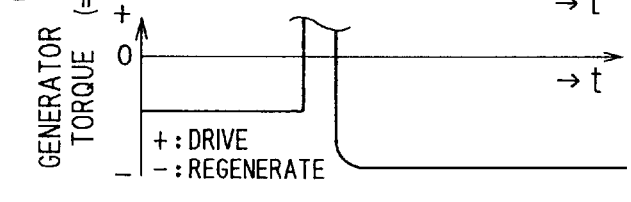
Figure 7H:
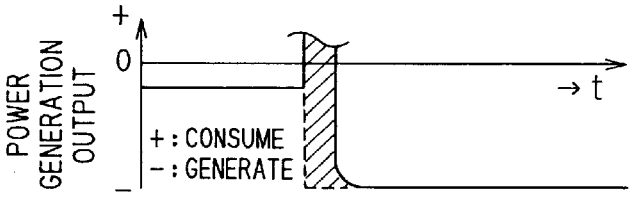
Figure 8A:
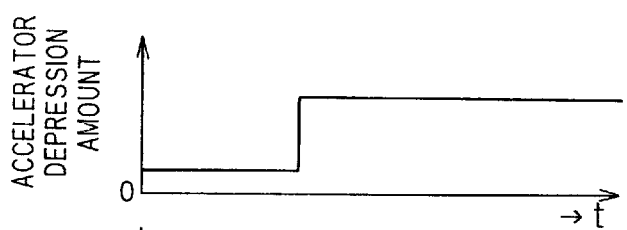
FIGS. 8(a)–8(h) show the response when an accelerator pedal is depressed in stepwise fashion when the vehicle is running (when this invention is applied).
Figure 8B:
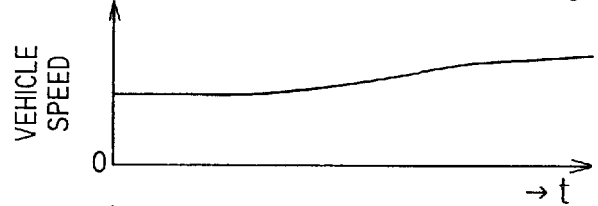
Figure 8C:
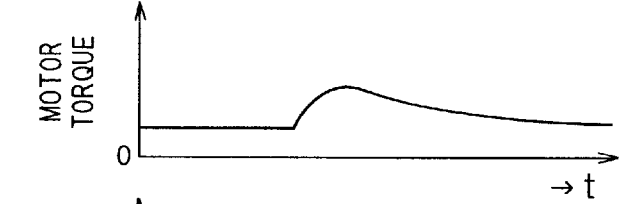
Figure 8D:
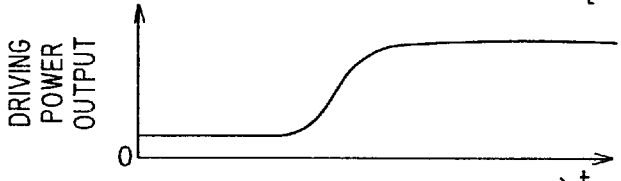
Figure 8E:
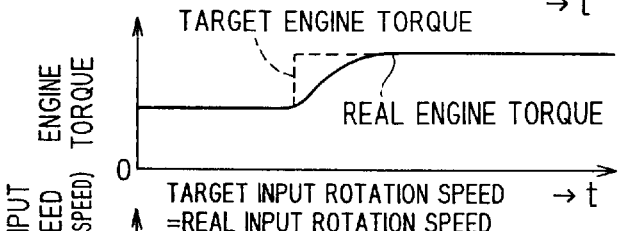
Figure 8F:
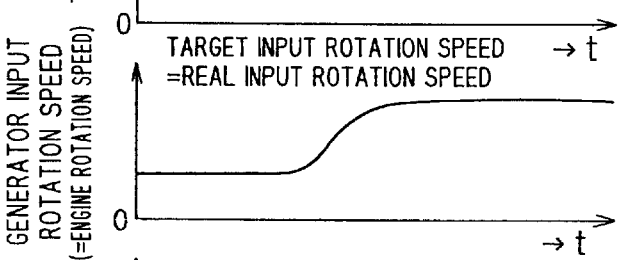
Figure 8G:
Figure 8H:
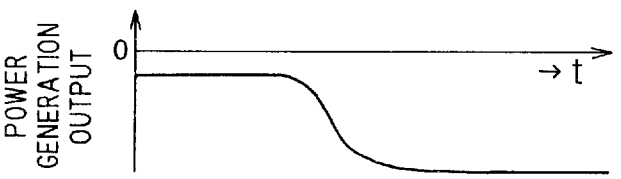

The step response of GR H1, H2 is as shown in FIGS. 6(a)–(c). As the value of Y1 becomes smaller due to the filter GR, the variation of the generator torque Tg toward the positive side is suppressed.

Here, the time constant $T_{GR}$ of the filter GR is made to vary according to the ratio of the "variation amount of the target engine torque tTe" to the "variation amount of the target input rotation speed tNi0, but when an engine is used where the maximum torque is relatively small and the engine is running in the vicinity of the maximum torque, the ratio of" the "variation amount of the target engine torque tTe" to the "variation amount of the target input rotation speed tNi0" becomes small, so the fluctuation of the filter time constant $T_{GR}$ increases. As a result, the fluctuation of driving force response relative to driver operations increases, and may give the driver an uncomfortable feeling.

In such a case, the filter time constant $T_{GR}$ may be set to a fixed value based on the minimum value of the ratio of the "variation amount of the target engine torque tTe" to the "variation amount of the target input rotation speed tNi0". By so doing, fluctuation of driving force response relative to drive operations is suppressed, and drivability is properly maintained.

A general second order filter transfer function is:

$$G(s) = \frac{1}{T^2 \cdot s^2 + 2\zeta T \cdot s + 1} \quad (11)$$

where:
T=time constant, and
$\zeta$=damping coefficient.

If this is expressed in a discrete time system so that it may be used in digital control, $$G_n = \frac{(\Delta t)^2}{T^2 + 2\zeta T \cdot \Delta t + (\Delta t)^2} \cdot u_n + \frac{2(T^2 + \zeta T \cdot \Delta t)}{T^2 + 2\zeta T \cdot \Delta t + (\Delta t)^2} \cdot G_{n-1} + \frac{-T^2}{T^2 + 2\zeta T \cdot \Delta t + (\Delta t)^2} \cdot G_{n-2} \quad (12)$$

where:
u=input parameter, and
$\Delta t$=computing period.

Equations (11) and (12) are equivalent. The output G is time series data computed for each $\Delta t$, and if the output at one instant is $G_n$, the output at a previous time $\Delta t$ is $G_{n-1}$ and the output at a time 2 $\Delta t$ before that is $G_{n-2}$.

Applying equation (7), $$T = T_{GR} = \frac{1}{CR}\sqrt{\frac{TE \cdot TG}{KI \cdot KG \cdot KP \cdot TE + 1}} \quad (13)$$

$$\zeta = \frac{TE + TG}{2\sqrt{TE \cdot TG \cdot (KI \cdot KG \cdot KP \cdot TE + 1)}} \quad (14)$$

Therefore, the filter GR is expressed by equation (12) using the time constant $T_{GR}$ and damping constant $\zeta$, and is used when computing the final target output torque tTo from the target output torque tTo0 and when computing the final target input rotation speed tNi from the target input rotation speed tNi0. Specifically, if for example the target output torque tTo0 is substituted in the input parameter u in equation (12), the output $G_n$ becomes the final target output torque tTo.

The time constant $T_{GR}$ and damping coefficient $\zeta$ are respectively determined by the equations (13), (14). Further, the adjustment coefficient CR of the time constant $T_{GR}$ is determined so as to satisfy equation (10), and from the characteristics of equation (10), the time constant adjustment coefficient CR can be calculated from the ratio of "the variation amount of the target engine torque tTe" to the "variation amount of the target input rotation speed tNi0".

However, when the engine 1 is frequently run in the vicinity of the maximum engine torque, the time constant $T_{GR}$ is set as a fixed value based on the minimum value of the "variation amount of the target engine torque tTe" to the "variation amount of the target input rotation speed tNi0" under normal running conditions, which prevents fluctuation of the time constant $T_{GR}$ from becoming large and fluctuation of the driving force response relative to driver operations from becoming large.

Next, the overall operation will be described.

First, for comparison, the case when this invention is not applied will be described. The case will be considered where the driver depresses the accelerator pedal sharply, as shown in FIGS. 7(a)–(h). In this case, the driving power output varies in stepwise fashion, so the target engine torque and target input rotation speed must both vary in stepwise fashion to prevent excess or deficiency of the power generation output relative to the driving power output.

However, under torque control by throttle control, the real engine torque response is slow compared to the command value (time constant≅0.1–0.3 seconds), so the increase of the real input rotation speed of the generator 2 consequently becomes slower. Hence, the difference between the target input rotation speed and the real input rotation speed increases, and the generator 2 generates a large torque on the positive side and increases the rotation speed due to rotation speed feedback control. In other words, the generator 2 generates a torque and increases the rotation speed before the rotation speed increases due to increase of engine torque. At this time, the power required by the generator 2 (corresponding to the shaded part in the diagram) must be supplied by the battery 9. Therefore, when this invention is not applied, not only is the power generation response slow, but the generator 2 consumes an excessive amount of power, so a discrepancy arises between the power generation output and the driving power output.

On the other hand, when this invention is applied, suitable filtering is performed on the target input rotation speed of the generator 2 so that, even if the driver does step sharply on the accelerator pedal, the generator 2 does not generate an excessive positive torque. In this way, the rate of variation of the command value (final target input rotation speed) to the generator 2 is suppressed as shown in FIGS. 8(a)–(h), and the rotation speed of the generator 2 can increase only under the engine torque.

The same filtering as in the case of the target input rotation speed may also be applied to the target output torque of the motor 4 to resolve the discrepancy between the driving power output and power generation output. As the torque response of the motor 4 is sufficiently fast (time constant=10 miniseconds), the motor 4 can follow the command value (final target output torque) without delay. Therefore, if this invention is applied, the responses of the driving power output and power generation output can be made to coincide, the generator 2 generates power without excess or deficiency, and the required battery capacity can be decreased.

According to the above embodiment, the driving power output and power generation output responses can be made to effectively coincide by applying delay filtering using the same filter on the target output torque and target input rotation speed. However, in the above construction, the driving power output may slightly overshoot the target value (target power generation output) when the target driving force varies sharply, and the power generation output may be insufficient.

When the vehicle speed increases due to increase of output torque, and the target output torque overshoots the target value prior to filtering, in the construction shown in FIG. 2, the vehicle speed is not fed back negatively, so it is fed back positively to the driving power output and the driving power output overshoots the target value. On the other hand, the target engine torque is computed by dividing the target power generation output by the real input rotation speed (=engine rotation speed), so even if the rotation speed control of the generator overshoots, it is fed back negatively to the target engine torque, and the engine output does not overshoot the target power generation output. Therefore, overshoot of the target output torque immediately leads to non-agreement of the driving power output and power generation output.

Figure 9A:
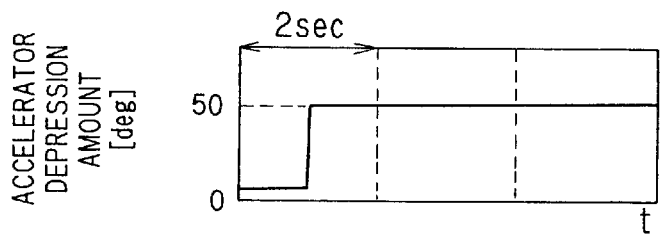
FIGS. 9(a)–9(h) show the response when the vehicle has suddenly accelerated from a low speed range in a first embodiment.
Figure 9B:
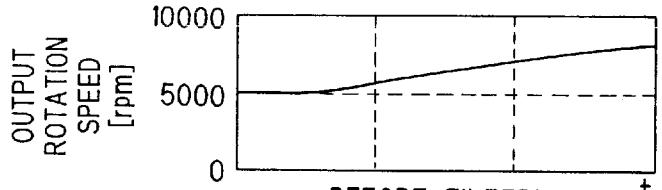
Figure 9C:
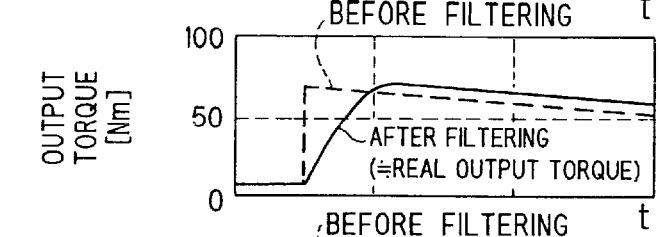
Figure 9D:
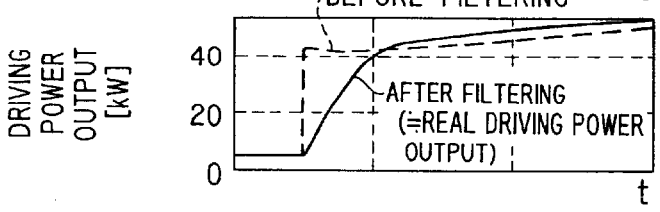
Figure 9E:
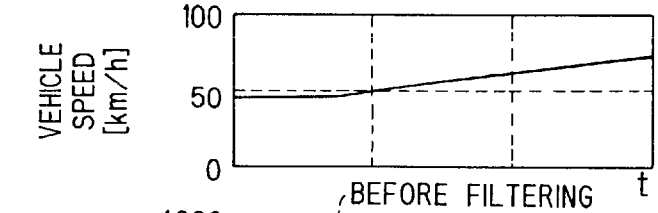
Figure 9F:
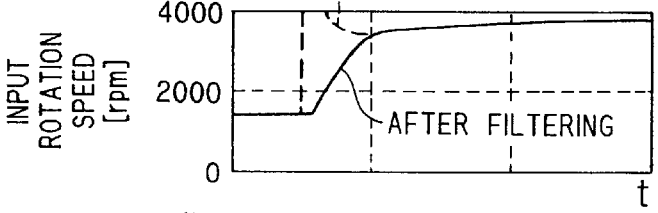
Figure 9G:
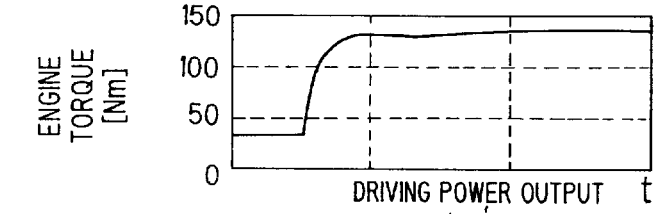
Figure 9H:
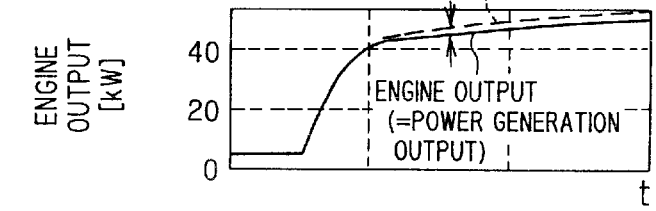

FIGS. 9(a)–(h) show the response when full acceleration is performed from a low vehicle speed in the preceding embodiment. When the target driving force varies sharply as during full acceleration, the target output torque may overshoot the target value prior to filtering as shown in FIG. 9(c). When the target output torque overshoots, the driving power output overshoots the target power generation output as a result (FIG. 9(d)), so that power generation output is insufficient compared to the driving power output as shown by the arrow in FIG. 9(h).

The embodiment of FIG. 2 improves this point, so overshoot of the target power generation output by the driving power output is suppressed, and the driving power output and power generation output are made to coincide more closely.

Figure 10:
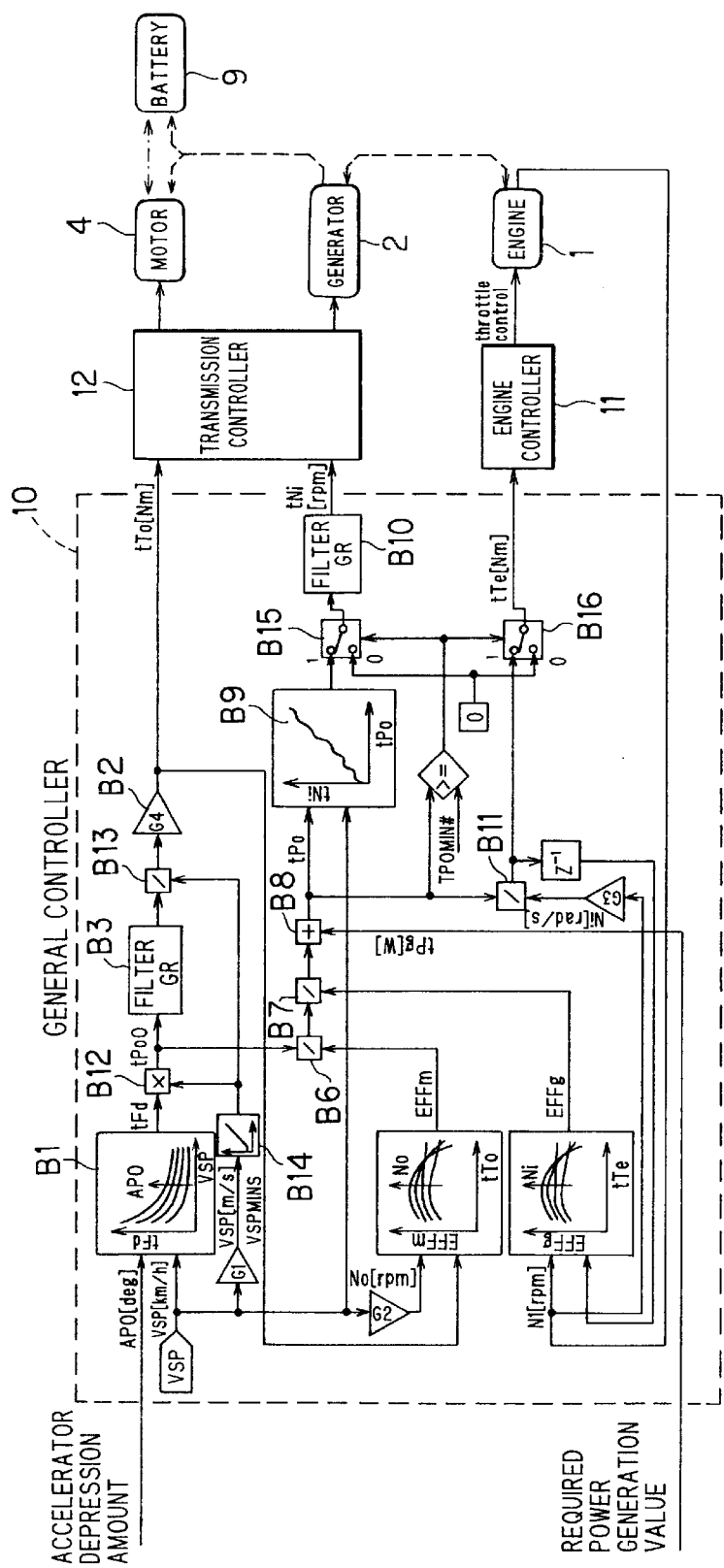
FIG. 10 is similar to FIG. 2, but showing a second embodiment of the invention.
Figure 11A:
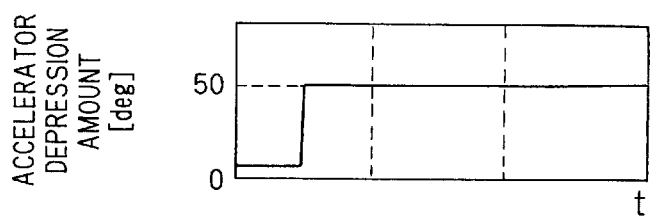
FIGS. 11(a)–11(h) show the response when the vehicle has suddenly accelerated from a low speed range in a second embodiment.
Figure 11B:
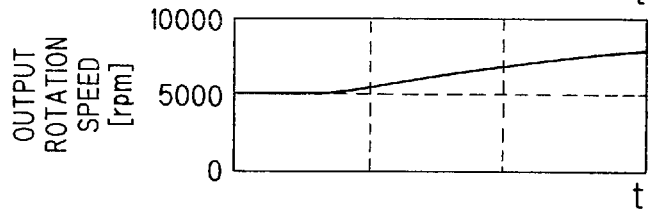
Figure 11C:
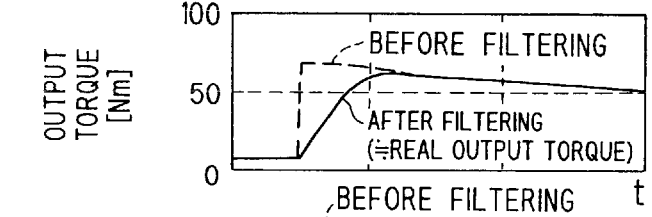
Figure 11D:
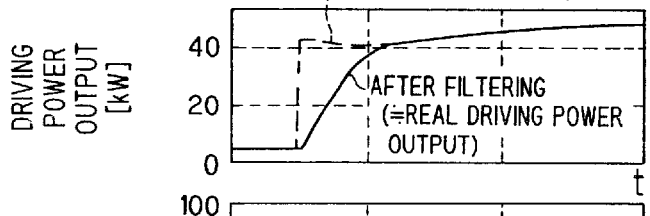
Figure 11E:
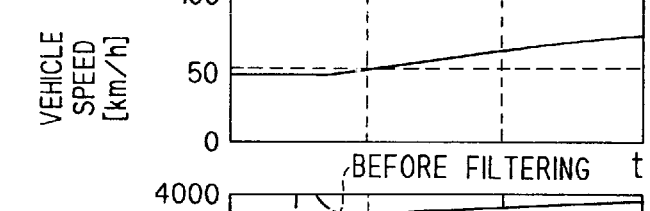
Figure 11F:
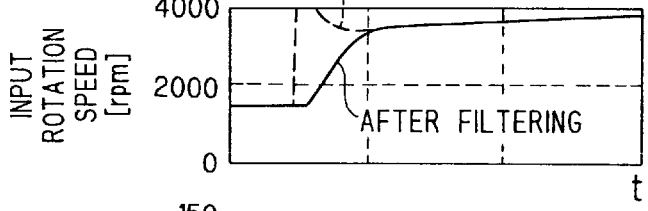
Figure 11G:
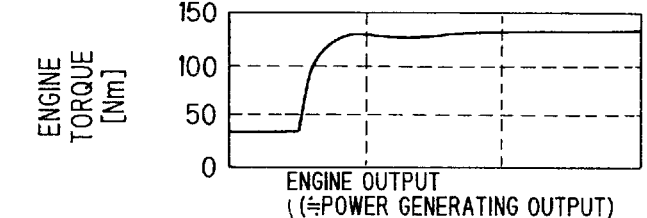
Figure 11H:
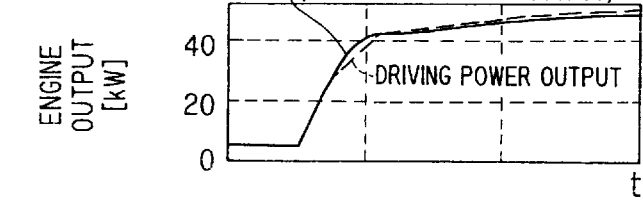

FIG. 10 is a block diagram showing the control of the general controller 10 according to the second embodiment. Parts of the construction identical to those of the aforesaid embodiment are assigned the same symbols.

In this embodiment, in the computation of the target output torque tTo, a basic value tPo0 of the target power generation output is calculated by multiplying the target driving force tFd which is set based on the accelerator depression amount APO and vehicle speed VSP, by the vehicle speed VSP [m/second] (B12). Filtering by the filter GR is then performed on the basic value tPo0 of the target power generation output (B3). The value obtained after this filtering is then divided by the vehicle speed VSP [m/second] (B13), and the target output torque tTo is computed by multiplying by a constant G4.

The reason for dividing by the vehicle speed VSP after filtering is to make the vehicle speed be fed back negatively even if the output torque overshoots, to suppress overshoot of the output torque and overshoot of the driving power output, and to prevent insufficiency of power generation output.

In the block diagram of FIG. 10, the basic value tPo0 of the target power generation output is computed by multiplying the target driving force tFd calculated by the target driving force setting map (B1) by the vehicle speed VSP [m/second], but instead a map may be drawn up for calculating the basic value tPo0 of the target power generation output based on the accelerator depression amount APO and vehicle speed VSP, and filtering performed by the filter GR on the basic value tPo0 of the target power generation output calculated by looking up this map.

The vehicle speed VSP used at this time is controlled to be not less than a predetermined value VSPMIN# by a lowest value limiter (B14). If this lowest value limiter were not provided, the target output torque tTo would also be zero when the vehicle speed is zero so that the vehicle could not start, but by providing this lowest value limiter, a larger value than zero is always set to the target output torque tTo even if the vehicle speed VSP is zero. Therefore, a torque corresponding to a creep torque is produced when the vehicle is at rest so that the vehicle can start smoothly. Also, by providing the lowest value limiter, a division by zero is avoided when the value after filtering is divided by the vehicle speed VSP (B13).

The same value is used for the vehicle speed VSP multiplied by the target driving force tFd for calculating the basic value tPo0 of the target power generation output, and the vehicle speed VSP used to divide the value after filtering the basic value tPo0, so an output torque in accordance with the target value is always obtained.

Switches (B15, B16) which, respectively, forcibly set the target input rotation speed tNi and the target engine torque tTe to zero when the basic value of the target power generation output tPo0 is less than the predetermined value TPOMIN#, are respectively provided in the last stage of B9 which sets the target input rotation speed of the generator 2, and B11 which computes the target engine torque of the engine 1. This is because, for the engine 1 to continue running stably, it must run at an output larger than a predetermined value, so if the target power generation output becomes less than the predetermined value TPOMIN#, the engine 1 and generator 2 both stop, and a so-called idle stop state is produced.

As a result, in the vehicle stop state, the engine 1 and generator 2 stop, and the vehicle is driven only by the motor 4 until the target power generation output exceeds the predetermined value even if the driver depresses the accelerator pedal from the stop state. At this time, the vehicle speed VSP used for computing the basic value tPo0 of the target power generation output is limited to be not less than the predetermined value VSPMIN# by the lowest value limiter, as described above, so the basic value tPo0 of the target power generation output quickly becomes larger than TPOMIN#, and the wasted time until the engine 1 and generator 2 start is shortened.

In this second embodiment, as in the case of FIGS. 9(a)–(h), the response when full acceleration is performed from the low vehicle speed range is shown in FIGS. 11(a)–(h). As shown in FIGS. 11(a)–(h), in the second embodiment, the vehicle speed is fed back negatively even if the target output tends to overshoot the target value due to the increase of vehicle speed, so overshoot of the target output torque is suppressed (FIG. 11(c)), and the driving power output can be made to coincide with the power generation output (FIG. 11(h)).

The block diagrams shown in FIG. 2 and FIG. 10 are only examples of the processing applying this invention. This invention also covers all situations which are substantially identical to those shown in FIG. 2 and FIG. 10, such as when the sequence of steps is changed, or when processing is added or removed to multiply/divide constants (unit transformations, etc.).

The entire contents of Japanese Patent Applications P11-322281 (filed Nov. 12, 1999) and P2000-106386 (filed Apr. 7, 2000) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A control device for a vehicle, the vehicle comprising:

an engine, a generator connected to the engine, and a motor driven by the power generated by the generator, connected to a drive shaft of the vehicle, and the control device comprising:

a sensor which detects a vehicle speed, a sensor which detects an accelerator depression amount, and a microprocessor programmed to:

compute either of a target driving force and target output torque of the motor based on the vehicle speed and accelerator depression amount, compute a delayed target output torque of the motor by performing a delay processing on either of the target driving force and target output torque, and control the torque of the motor based on the delayed target output torque.

2. A control device as defined in claim 1, wherein the microprocessor is further programmed to:

compute a target power generation output of the generator based on either of the target driving force and target output torque, compute a target input rotation speed of the generator based on the target power generation output, compute a delayed target input rotation speed of the generator by performing the delay processing on the target input rotation speed, and control the rotation speed of the generator based on the delayed target input rotation speed.

3. A control device as defined in claim 2, wherein the microprocessor is further programmed to:

compute a target engine torque of the engine according to the target power generation output, and control the engine based on the target engine torque.

4. A control device as defined in claim 1, wherein the delay processing is delay processing using a filter of second or higher order.

5. A control device as defined in claim 3, wherein:

the delay processing is delay processing using a filter of second or higher order, and the time constant of the filter is computed based on the ratio of the variation amount of the target engine torque to the variation amount of the target input rotation speed.

6. A control device as defined in claim 3, wherein:

the delay processing is delay processing using a filter of second or higher order, and the time constant of the filter is a fixed value computed based on the minimum value of the ratio of the variation amount of the target engine torque to the variation amount of the target input rotation speed.

7. A control device as defined in claim 4, wherein:

the microprocessor is further programmed to compute the delayed target output torque of the motor by dividing by the vehicle speed after performing delay processing on either of the target driving force and target output torque.

8. A control device as defined in claim 7, wherein:

the microprocessor is further programmed to limit the vehicle speed used for the computation to a value larger than a predetermined value.

9. A control device as defined in claim 4, wherein:

the microprocessor is further programmed to:

compute the delayed target output torque of the motor by performing the delay processing on the result of dividing either of the target driving force and target output torque by the vehicle speed, and limit the vehicle speed used for the computation to a larger value than a predetermined value.

10. A control device as defined in claim 2, wherein:

the microprocessor is further programmed to compute the target power generation output by considering any of the efficiency of the motor, the efficiency of the generator and the power generation requirement of electrical accessories.

11. A control device for a vehicle, the vehicle comprising:

an engine, a generator connected to the engine, and a motor driven by the power generated by the generator, connected to a drive shaft of the vehicle, and the control device comprising:

means for detecting a vehicle speed, means for detecting an accelerator depression amount, means for computing either of a target driving force and target output torque of the motor based on the vehicle speed and accelerator depression amount, means for computing a delayed target output torque of the motor by performing a delay processing on either of the target driving force and target output torque, and means for controlling the torque of the motor based on the delayed target output torque.

* * * * *